(12) United States Patent
  Taneichi (10) Patent No.: US 10,619,344 B1
(45) Date of Patent: Apr. 14, 2020

(54) REINFORCING HARDWARE FOR WOODEN HOUSING

(71) Applicant: Kaoru Taneichi, Kanagawa (JP)

(72) Inventor: Kaoru Taneichi, Kanagawa (JP)

( * ) Notice: Subject to any disclaimer, the term of this patent is extended or adjusted under 35 U.S.C. 154(b) by 0 days.

(21) Appl. No.: 16/382,490

(22) Filed: Apr. 12, 2019

(51) Int. Cl.
  *E04B 1/58* (2006.01)
  *F16B 35/06* (2006.01)

(52) U.S. Cl.
  CPC .............. *E04B 1/58* (2013.01); *F16B 35/06* (2013.01); *E04B 2001/5875* (2013.01); *E04B 2001/5887* (2013.01)

(58) Field of Classification Search
  CPC ............ E04B 1/58; E04B 2001/5875; E04B 2001/5887; F16B 35/06
  USPC ........................................................ 411/267
  See application file for complete search history.

(56) References Cited

U.S. PATENT DOCUMENTS

| | | | | |
|---|---|---|---|---|
| 3,456,412 A * | 7/1969 | Decombas | ............... | F16B 7/00 52/489.1 |
| 3,943,818 A * | 3/1976 | Pryor | ....................... | E01B 3/10 411/389 |
| 4,197,783 A * | 4/1980 | Lancelot, III | ....... | E04G 17/0654 228/173.6 |
| 4,729,707 A * | 3/1988 | Takahashi | ............. | F16B 35/042 403/45 |
| 4,888,926 A * | 12/1989 | Lutz, III | ................... | E04B 5/12 52/291 |
| 5,205,692 A * | 4/1993 | Kelbert | ................. | F16B 5/0216 411/173 |
| 6,007,284 A * | 12/1999 | Taneichi | ............... | E04B 1/2604 411/267 |
| 2013/0209193 A1* | 8/2013 | Doye | .................... | F16B 35/065 411/166 |
| 2015/0198197 A1* | 7/2015 | Taneichi | ................ | F16B 43/00 411/433 |
| 2015/0219144 A1* | 8/2015 | Taneichi | ............... | F16B 39/282 411/190 |
| 2016/0160906 A1* | 6/2016 | Blaess | ................. | F16B 25/0031 403/122 |
| 2018/0163760 A1* | 6/2018 | Petermaier | ............. | F16B 35/06 |

FOREIGN PATENT DOCUMENTS

JP      2000-320013 A      11/2000

* cited by examiner

*Primary Examiner* — Paola Agudelo
(74) *Attorney, Agent, or Firm* — Norris McLaughlin, P.A.

(57) ABSTRACT

Reinforcing hardware for wooden housing is configured by: a strap nut that has a screw portion and a strap portion; a bolt that has a first screw portion that is screwed into the screw portion of the strap nut and a second screw portion on a side opposite the first screw portion; and a nut member that screws onto the second screw portion. A tool engaging portion into which a tip end portion of a tool is able to be inserted and by which the bolt is able to be rotated is formed on at least an end surface on the first screw portion side, and the second screw portion is formed as a screw that turns in a direction opposite the first screw portion.

5 Claims, 10 Drawing Sheets

REINFORCING HARDWARE FOR WOODEN HOUSING

BACKGROUND OF THE INVENTION

1. Field of the Invention

The present invention relates to reinforcing hardware for wooden housing that connects and reinforces beams, such as a vertical girder and a horizontal girder, of a wooden housing.

2. Description of the Related Art

Conventionally, as reinforcing hardware for wooden housing that connects and reinforces a vertical girder and a horizontal girder, hardware commonly referred to as a strap bolt is known. In this reinforcing hardware, a bolt is fixedly attached to a metal strap. A strap bolt such as this has a disadvantage in that, even when retightening or the like is to be performed after construction of the housing, retightening or the like cannot be performed because the bolt cannot be rotated from the strap bolt side and a nut is positioned on an outer side (within an outer wall).

In addition, when a housing is to be demolished, because the vertical girder and the horizontal girder are connected by the strap bolt, the coupling of the vertical girder and the horizontal girder cannot be easily released. A joining portion of pieces of lumber cannot be disassembled unless the strap bolt or the like is destroyed.

Regarding hardware in which the bolt is not fixed to the strap, for example, "a strap characterized by including: a strap main body in which a bolt is detachably or fixedly attached to one end portion; a bolt insertion hole in which a notched portion is formed in an opposing section formed in a section near an other end portion of the strap main body; and a bolt that bites into lumber, such as a column, in a rotating manner by being driven into a bolt main body portion in a section near a head portion inserted into the bolt insertion hole and has a biting piece that is formed in a section corresponding to the notched portion of the bolt insertion hole" (Patent Literature 1) is known.

However, regarding such a strap as well, because the bolt itself cannot be rotated and the nut is positioned on the outer side (within the outer wall), there is a disadvantage in that retightening or the like cannot be performed.

Here, when a bolt in which the biting piece is not provided is used, the bolt can be rotated. However, the nut may spin. Retightening cannot be reliably performed. During demolition of a housing as well, disassembly may not be able to be performed as a result of the nut spinning, and the bolt or the like may be required to be destroyed.

[Patent Literature 1] Japanese Patent Laid-open Publication No. 2000-320013

SUMMARY OF THE INVENTION

In light of conventional disadvantages such as those described above, an object of the present invention is to provide reinforcing hardware for wooden housing that is able to be easily and reliably retightened, and easily disassembled during demolition.

The description above, other objects, and novel features of the present invention will become more completely clear when the following description is read with reference to the accompanying drawings.

However, the drawings are mainly for description and do not limit the technical scope of the present invention.

To achieve the above-described object, reinforcing hardware for wooden housing of the present invention is configured by: a strap nut that has a screw portion and a strap portion; a bolt that has a first screw portion that is screwed into the screw portion of the strap nut and a second screw portion on a side opposite the first screw portion; and a nut member that screws onto the second screw portion. A tool engaging portion into which a tip end portion of a tool is able to be inserted and by which the bolt is able to be rotated is formed on at least an end surface on the first screw portion side, and the second screw portion is formed as a screw that turns in a direction opposite the first screw portion.

Effects of the Invention

As is clear from the description above, the present invention achieves the effects listed below:

(1) According to a first aspect of the invention, the tool engaging portion is formed on the end surface on the first screw portion side. Therefore, even after a housing is constructed, a tip end portion of a screwdriver or the like can be engaged with the tool engaging portion, and retightening or the like can be performed.

(2) The strap nut, the bolt, and the nut member can be separated. Therefore, during demolition, the strap nut and the bolt can each be separated by the bolt being rotated.

Consequently, coupling of pieces of lumber can be easily released. The disassembled materials can be reused.

(3) According to second to fourth aspects of the invention as well, effects similar to (1) and (2), described above, can be achieved. In addition, the second screw portion can be screwed to the nut member simply by the bolt being pressed into the nut member.

Furthermore, the strap nut and the bolt can each be more easily separated during demolition.

(4) Moreover, because the washer member is provided, the nut member can be easily fixed to lumber and the like, and used.

BRIEF DESCRIPTION OF THE DRAWING

FIG. 1 to FIG. 6 are explanatory diagrams according to a first embodiment of the present invention.

FIG. 7 to FIG. 9 are explanatory diagrams according to a second embodiment of the present invention.

FIG. 10 is an explanatory diagram according to a third embodiment of the present invention.

EXPLANATION OF REFERENCE NUMBERS 1, 1A, 1B: reinforcing hardware
2, 2A: screw portion
3, 3A strap portion
4, 4A: strap nut
5: first screw portion
6: second screw portion
7: bolt
8, 8A, 8B: nut member
9: nail hole
10: bolt through-hole
11, 11A: tool engaging portion
12: nut segment housing portion
13: nut main body
14: nut segment
15: urging means
16: holding means
17, 17A: washer member
18: prong
19: nut inserting portion
20: screw hole
S: vertical girder
C: horizontal girder

DETAILED DESCRIPTION OF THE PREFERRED EMBODIMENTS

The present invention will hereinafter be described in detail based on embodiments for carrying out the present invention shown in the drawings.

According to a first embodiment for carrying out the present invention shown in FIG. 1 to FIG. 6, reference number 1 represents reinforcing hardware for wooden housing (referred to, hereafter, as "reinforcing hardware") that connects and reinforces beams, such as a vertical girder S and a horizontal girder C) of a wooden housing.

Figure 1:
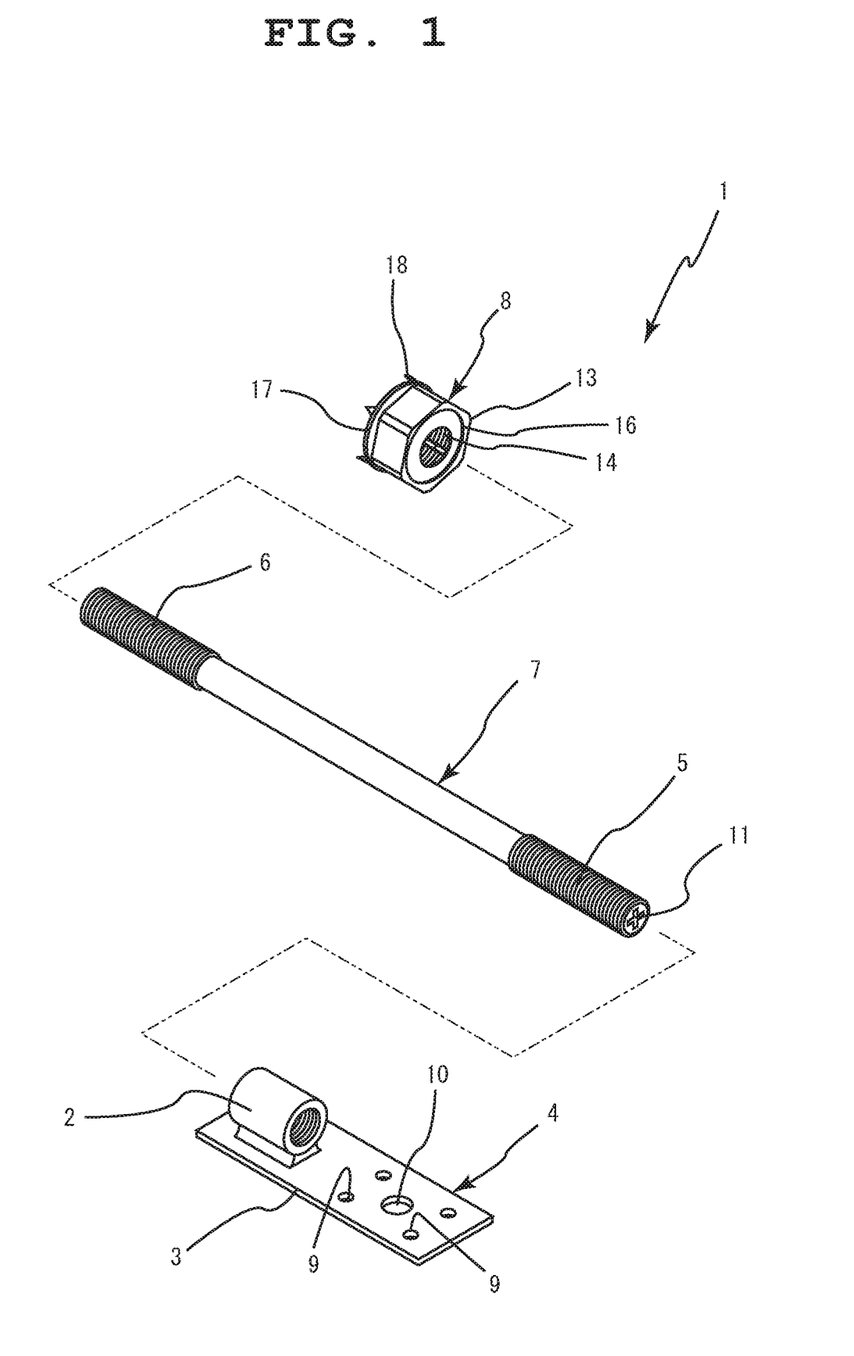
FIG. 1 is an exploded perspective view of reinforcing hardware for wooden housing according to the first embodiment.

As shown in FIG. 1, the reinforcing hardware is configured by a strap nut 4, a bolt 7, and a nut member 8. The strap nut 4 has a screw portion 2 (female screw) and a strap portion 3. The bolt 7 has a first screw portion 5 (male screw) and a second screw portion 6 (male screw). The first screw portion 5 is screwed into the screw portion 2 of the strap nut 4. The second screw portion 6 is formed on an end portion of the bolt 7 on the side opposite the first screw portion 5. The nut member 8 screws onto the second screw portion 6.

Figure 2:
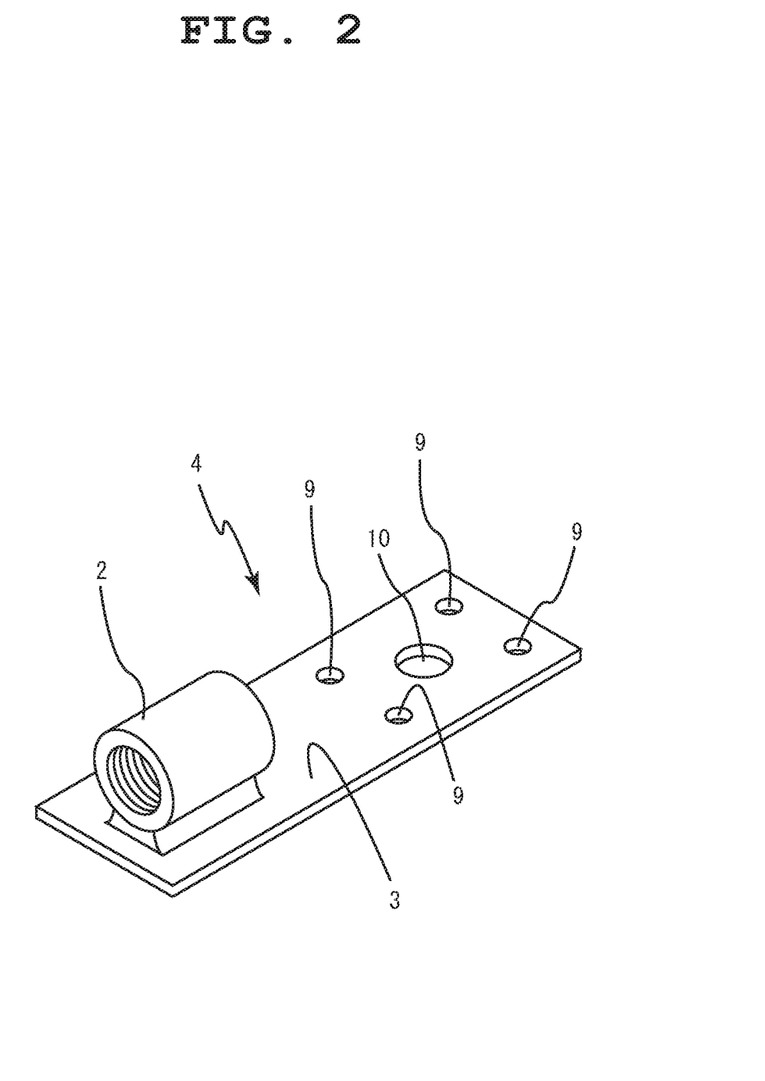
FIG. 2 is an explanatory diagram of a strap nut.

The strap nut 4 is configured by the strap portion 3 and the screw portion 2. The strap portion 3 is rectangular. A nail hole 9 into which a nail is inserted and a bolt through-hole 10 are formed in the strap portion 3. The screw portion 2 is screwed to the first screw portion 5. For example, as shown in FIG. 2, the screw portion 2 is fixed to a surface of the strap portion 3. According to the present embodiment, the screw portion 2 is fixed to a substantially center portion of the surface of the strap portion 3 by welding. A screw hole of the screw portion 2 is formed such as to be screwed to the first screw portion 5.

Figure 3:
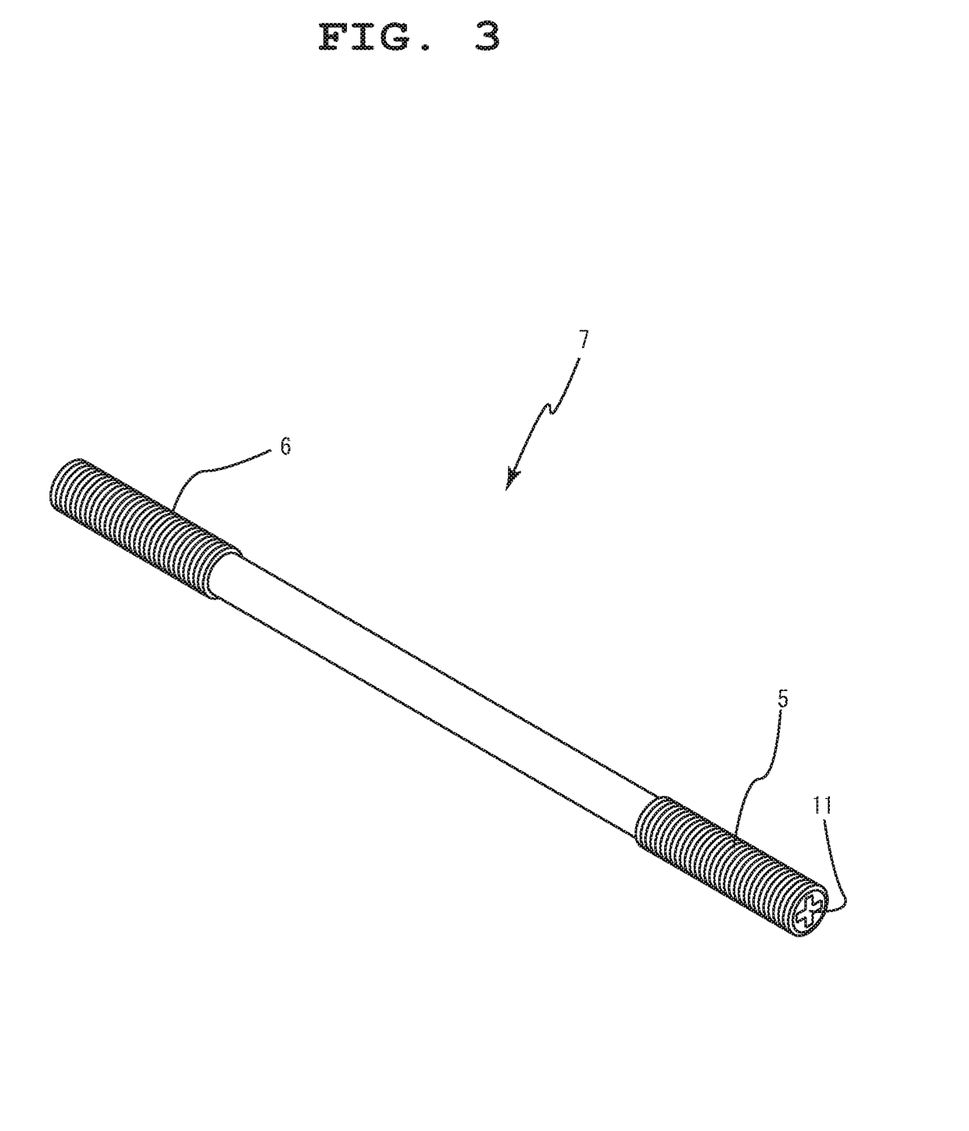
FIG. 3 is an explanatory diagram of a bolt.

In the bolt 7, the first screw portion 5 is formed near one end portion. Meanwhile, the second screw portion 6 is formed near the other end portion on the side opposite the first screw portion 5.

In addition, a tool engaging portion 11 (having a minus shape, a plus shape, or the like) that engages with a tool, such as a screwdriver or an Allen wrench, is formed on an end surface of the bolt 7 on the first screw portion 5 side. According to the present embodiment, a substantially cross-shaped tool engaging portion 11 is formed such that a tip portion of a Phillips head screwdriver engages therewith.

The tool engaging portion 11 may be formed on only the end surface on the first screw portion 5 side. Alternatively, the tool engaging portion 11 may be formed on the end surface on the first screw portion 5 side and the end surface on the second screw portion 6 side.

According to the present embodiment, the first screw portion 5 of the bolt is formed to be a left-handed screw. The second screw portion 6 is formed to be a right-handed screw. As a result of the screw portions 5 and 6 being formed in this manner, retightening can be performed by the bolt 7 being rotated in a single direction.

Here, all that is required is that the first screw portion 5 and the second screw portion 6 be screws that are turned in opposite directions. Therefore, the first screw portion 5 may be the right-handed screw and the second screw portion 6 may be the left-handed screw.

Figure 4:
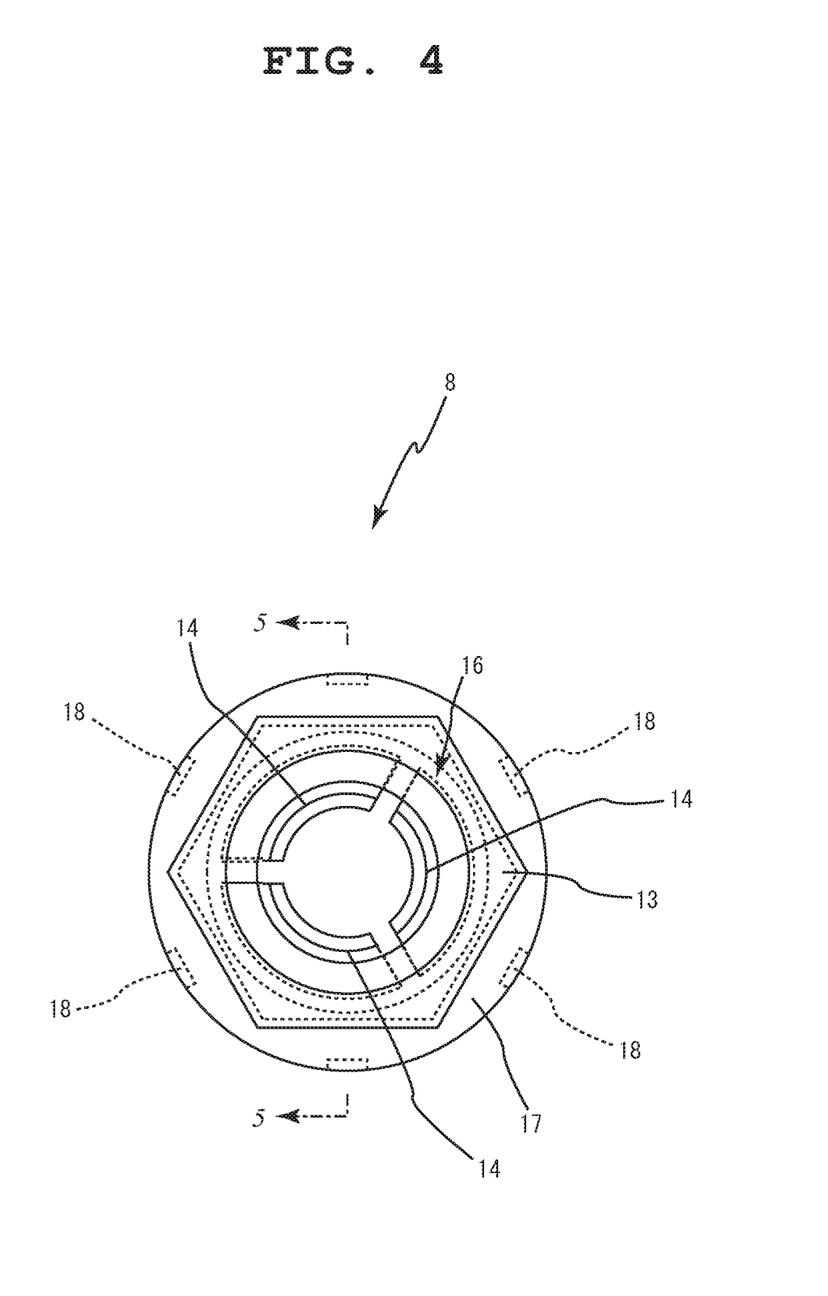
FIG. 4 is a planar view of a nut member.
Figure 5:
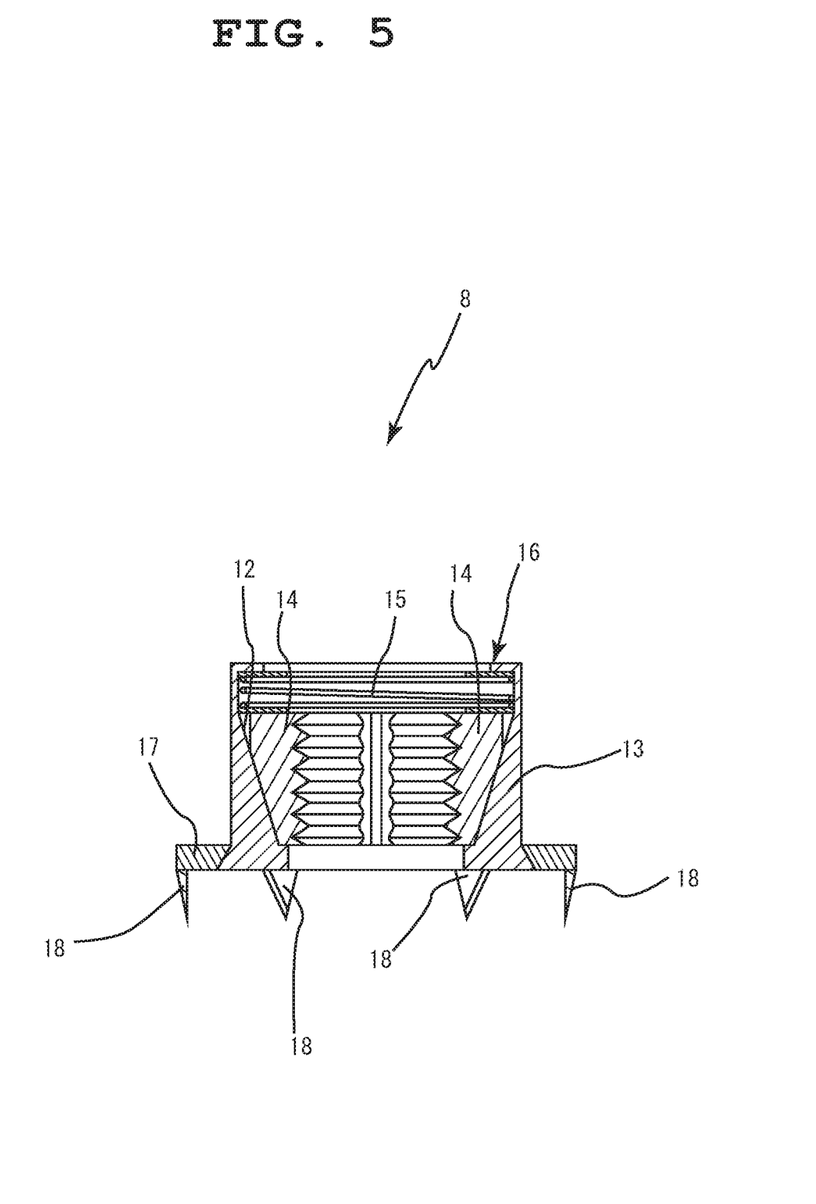
FIG. 5 is a cross-sectional view taken along 5-5 in FIG. 4.

The nut member 8 is configured by a nut main body 13, a plurality of nut segments 14, an urging means 15, a holding means 16, and a washer member 17. The nut main body 13 has a single or a plurality of nut segment housing portions 12. According to the present embodiment, the nut main body 13 has three nut segment housing portions 12. The nut segment 14 is housed in the nut segment housing portion 12. According to the present embodiment, three nut segments 14 are respectively housed in the three nut segment housing portions 12. The urging means 15 is provided above the nut segments 14 and urges the nut segments 14 in a direction towards a bottom surface of the nut main body 13. The holding means 16 holds the nut segments 14 and the urging means 15 (such as an urging spring) inside the nut main body 13. The washer member 17 is provided in a lower end portion of the nut main body 13.

The nut segment 14 of the nut member 8 is formed such as to be screwed onto the second screw portion 6.

According to the present embodiment, in the holding member 16, a washer is locked by an upper end portion of the nut main body 13 being bend inward by crimping. The holding means 16 thereby holds the nut segments 14 and the urging mean 15 inside the nut main body 13. For example, the holding means 16 may be such that a screw is formed on an outer peripheral surface near the upper portion of the nut main body 13. A cap nut-like cover body is screwed onto the screw, and the nut segments 14 and the urging means 15 are thereby held inside the nut main body 13.

According to the present embodiment, the washer member 17 is rotatably provided in the nut main body 13. A plurality of prongs 18 are formed on a bottom surface of the washer member 17. The nut member 8 is attached to lumber by the prongs 18.

A nut in which publicly known nut segments are used can be used as the nut member 8.

Figure 6:
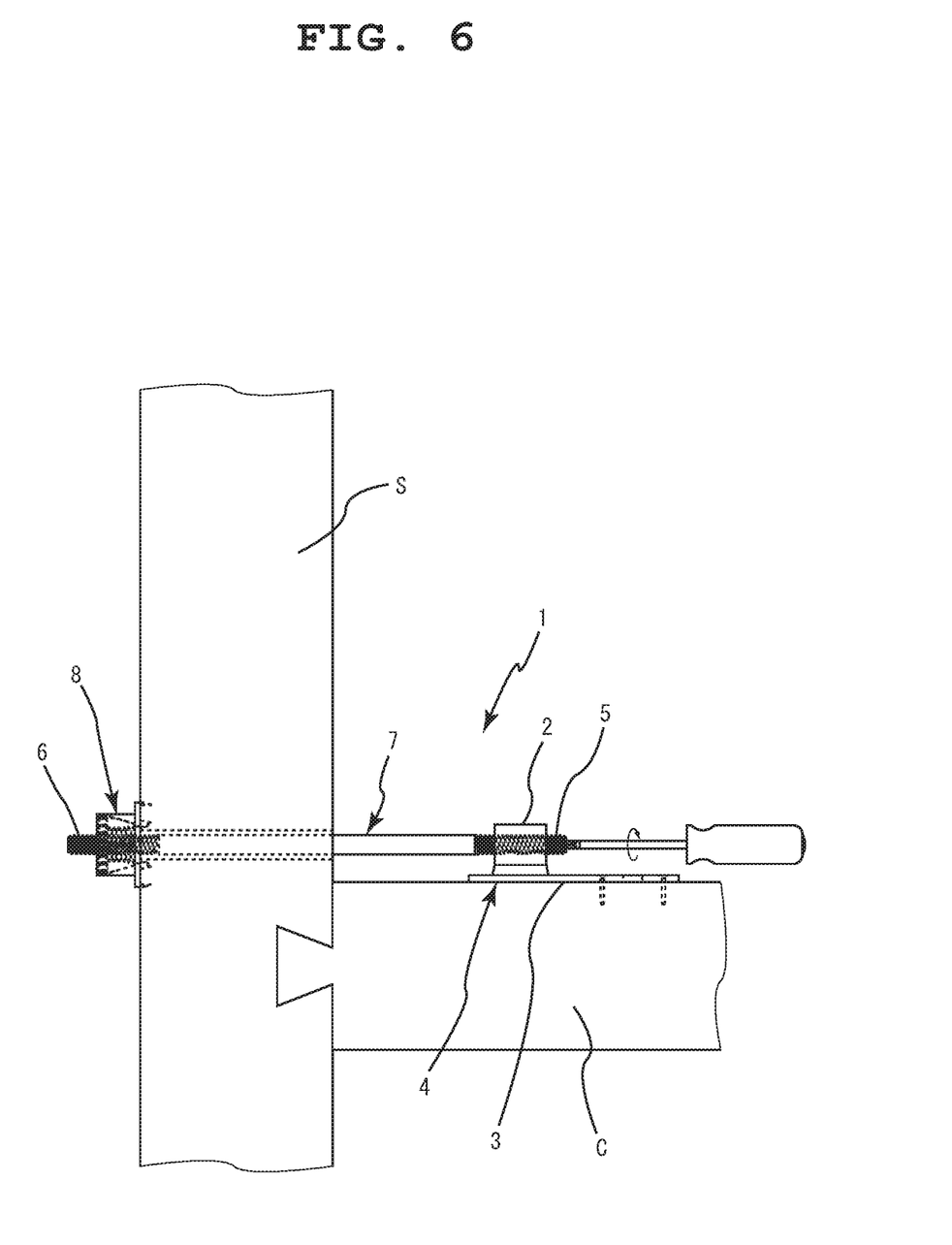
FIG. 6 is an explanatory diagram of when retightening or the like is performed.

When retightening is performed using the reinforcing hardware 1 of the present invention, as shown in FIG. 6, the tip end portion of a screwdriver is engaged with the tool engaging portion 11 and the bolt 7 is rotated. Because the first screw portion 5 and the second screw portion 6 are formed as screws that are turned in opposite directions, tightening of the screw portion 2 and the nut member 8 can be simultaneously performed.

When demolition is performed, as a result of the bolt 7 being rotated in the direction opposite the direction when retightening, on the nut member 8 side, the bolt 7 attempts to move towards the strap nut 4 side (inward) as a result of the rotation of the bolt 7. However, the strap nut 4 side also attempts to move towards the nut member 8 side (inward).

Therefore, the screw portion 2 and the nut member 8 receive force in an axial direction. As a result, the nut segments 14 are pressed by this force and move outward against the urging force from the urging means 15. An inner diameter of the nut member 8 thereby increases. As a result, the first screw portion 5 moves in a direction (towards the nut member 8 side detaching from the screw portion 2 of the strap nut 4. The reinforcing hardware 1 can be thereby be disassembled.

Other Embodiments for Carrying Out the Invention

Next, other embodiments for carrying out the present invention, shown in FIG. 7 to FIG. 10, will be described. Regarding the descriptions of the other embodiments for carrying out the present invention, constituent sections that are identical to those according to the above-described first embodiment for carrying out the present invention are given the same reference numbers. Redundant descriptions are omitted.

Figure 7:
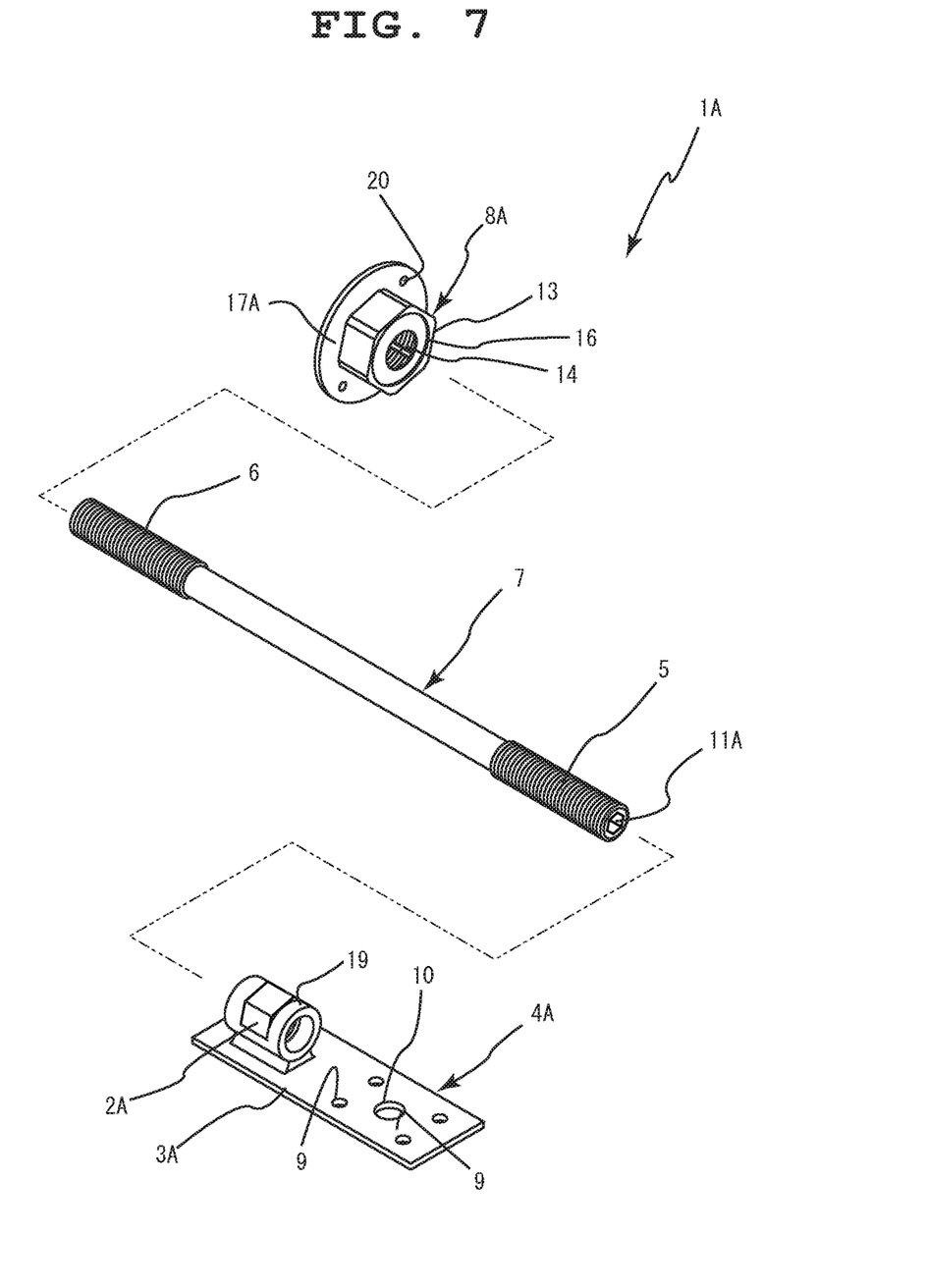
FIG. 7 is an exploded perspective view of reinforcing hardware for wooden housing according to the second embodiment.
Figure 8:
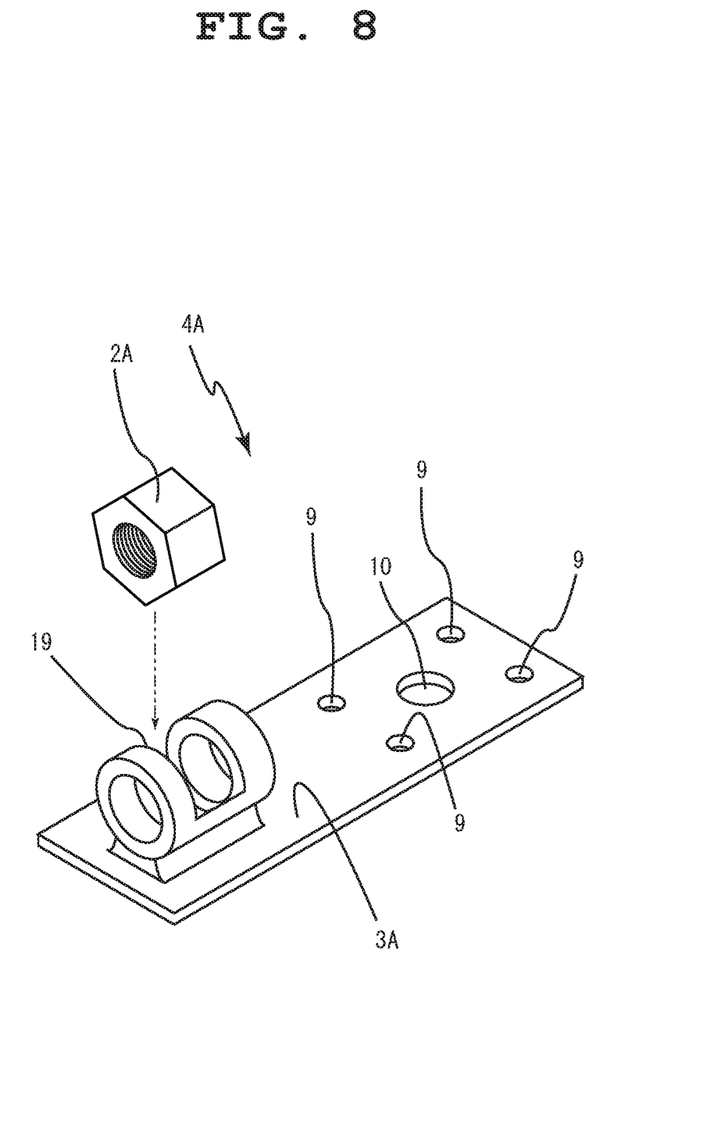
FIG. 8 is an explanatory diagram of a strap nut.
Figure 9:
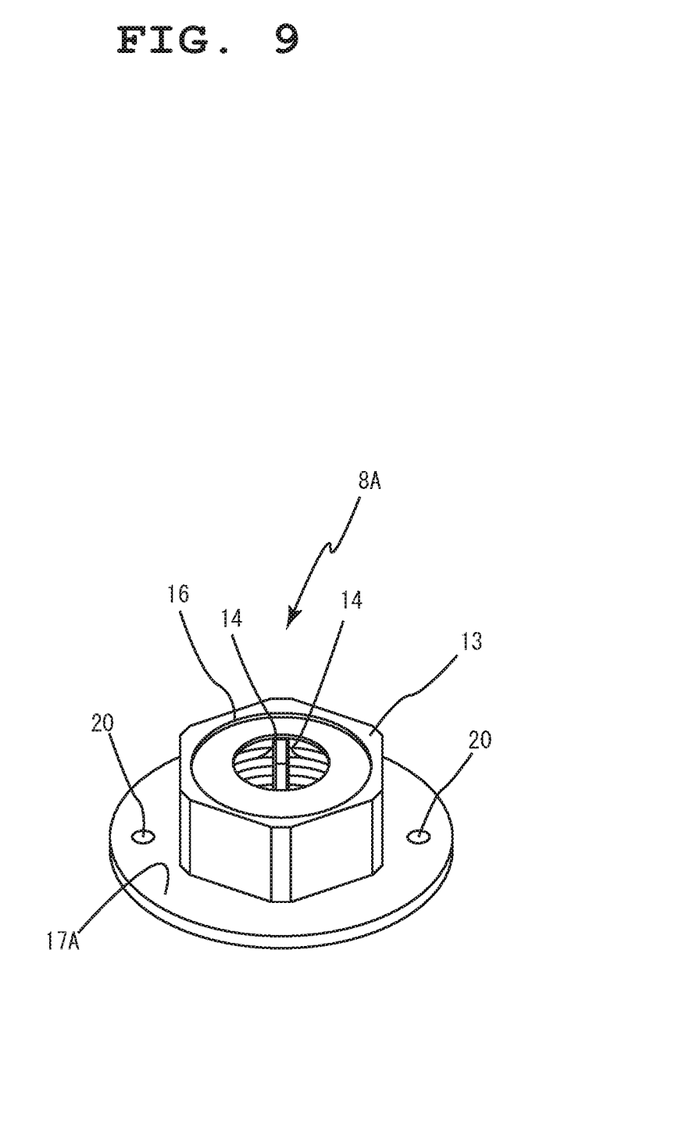
FIG. 9 is an explanatory diagram of a nut member.

A second embodiment for carrying out the present invention, shown in FIG. 7 to FIG. 9, mainly differs from the first embodiment for carrying out the present invention in that a strap nut 4A and a nut member 8A are used. The strap nut 4A is configured by a strap portion 3A that has a nut inserting portion 19 and a nut 2A that is inserted into the nut inserting portion 19 and serves as a screw portion 2A. In the nut member 8A, a washer member 17A is fixed near a bottom surface of the nut main body 13. In addition, a hexagonal hole-shaped tool engaging portion 11A is formed on the end surface of the first screw portion 5 of the bolt 7. A reinforcing hardware 1A such as this can also achieve working effects similar to those according to the first embodiment for carrying out the present invention.

Here, the washer member 17A according to the present embodiment does not have tabs. The washer member 17A is provided with plurality of screw holes 20 into which countersunk screws can be inserted and is attached to lumber by the countersunk screws.

Figure 10:
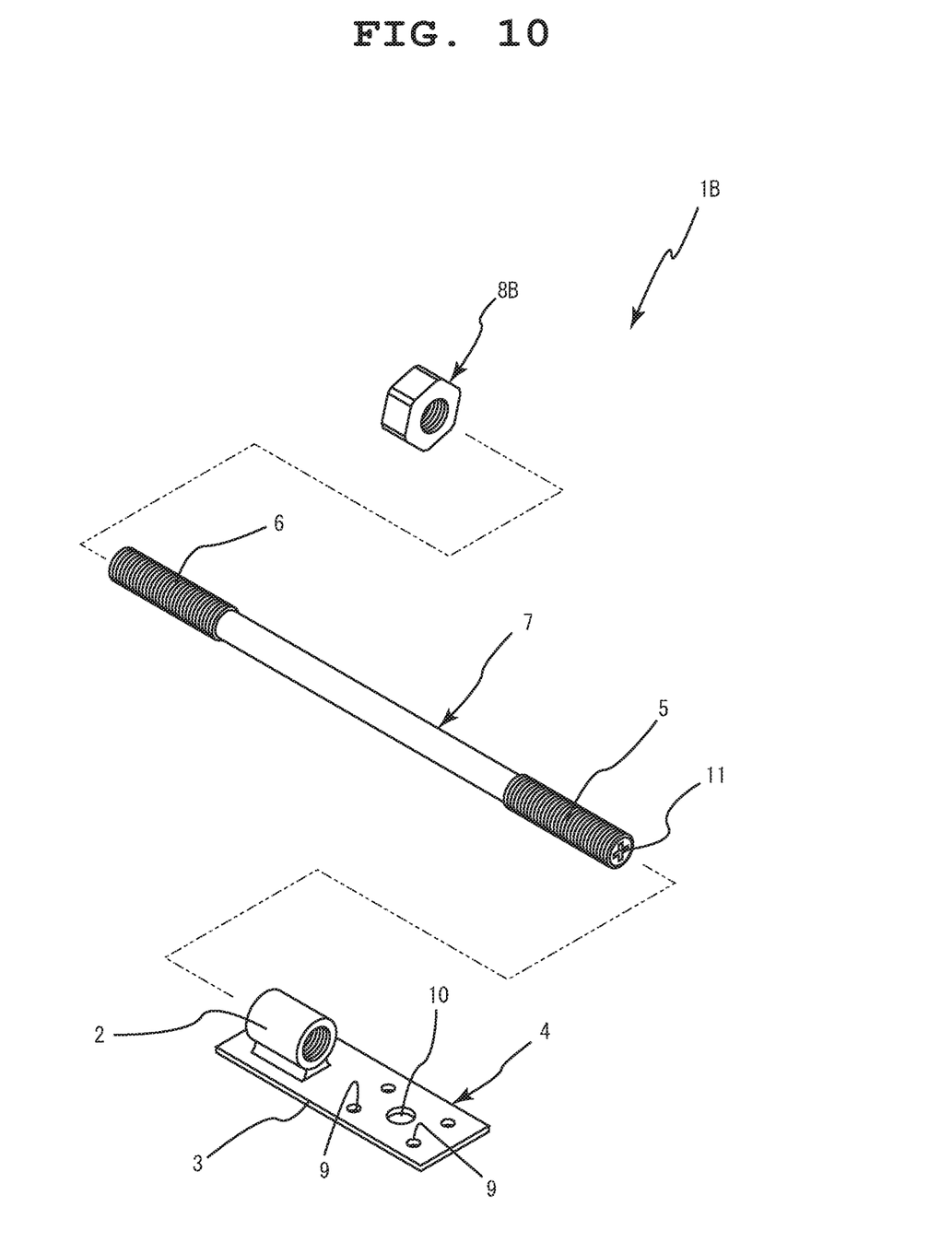
FIG. 10 is an exploded perspective view of reinforcing hardware for wooden housing according to the third embodiment.

A third embodiment for carrying out the present invention shown in FIG. 10 mainly differs from the above-described first embodiment for carrying out the present invention in that a typical nut that does not include nut segments is used as a nut member 8B. A reinforcing hardware 1B such as this can also achieve working effects similar to those according to the first embodiment for carrying out the present invention.

According to the present embodiment, because the typical nut is used as the nut member 8B, when the bolt 7 is rotated during demolition, the nut member 8B receives force in the axial direction and the nut member 8B itself moves outward. The bolt 7 detaches from the strap nut 4 and disassembly can thereby be performed.

According to the embodiments of the present invention, an embodiment in which three nut segments are used as the nut segments of the nut member is described. However, all that is required is that a plurality of nut segments be provided. For example, two, six, or eight nut segments may be used.

INDUSTRIAL APPLICABILITY

The present invention is used in an industry for manufacturing reinforcing hardware for wooden housing, an industry for constructing wooden housing, and an industry for construction using heavy- and light-weight steel frames.

What is claimed is:

1. Reinforcing hardware for wooden housing comprising:
a strap nut that has a screw portion and a strap portion;
a bolt that has a first screw portion configured to be screwed into the screw portion of the strap nut and a second screw portion on a side opposite the first screw portion, wherein one of the first and second screw portions is right-handed;
a nut member configured to screw onto the second screw portion, and
a tool engaging portion formed at least on an end surface of the first screw portion, the tool engaging portion being configured for insertion therein of a tip end portion of a tool and for rotation of the bolt by the tool, wherein:
the nut member is composed of a nut main body that has a nut segment housing portion, a plurality of nut segments that are housed in the nut segment housing portion, an urging means that is provided above the nut segments and is configured to urge the nut segments in a direction towards a bottom surface of the nut main body, a holding means configured to hold the nut segments and the urging means within the nut main body, and a washer member that is provided in the nut main body.

2. The reinforcing hardware for wooden housing according to claim 1, wherein:
a prong configured to bite into lumber is provided on a bottom surface of the washer member.

3. The reinforcing hardware for wooden housing according to claim 2, wherein:
the washer member is configured to be rotatable in relation to the nut main body.

4. The reinforcing hardware for wooden housing according to claim 1, wherein:
the washer member is configured to be rotatable in relation to the nut main body.

5. Reinforcing hardware for wooden housing comprising:
a strap nut that has a screw portion and a strap portion, wherein the strap portion of the strap nut is configured to be fixed to a first wooden member of the wooden housing;
a bolt that has a first screw portion configured to be screwed into the screw portion of the strap nut and a second screw portion on a side opposite the first screw portion, wherein one of the first and second screw portions is left-handed and the other of the first and second screw portions is right-handed;
a nut member configured to be non-rotatably fixed to a second wooden member of the wooden housing and to have the second screw portion of the bolt screwed into the nut member while the nut member is non-rotatably fixed to the second wooden member; and
a tool engaging portion formed at least on an end surface of the first screw portion of the bolt, the tool engaging portion being configured for insertion therein of a tip end portion of a tool and for rotation, by the tool, of the bolt while the first screw portion of the bolt is screwed into the screw portion of the strap nut with the strap portion of the strap nut being fixed to the first wooden member and while the second screw portion of the bolt is screwed into the nut member with the nut member non-rotatably fixed to the second wooden member, wherein the reinforcing hardware for wooden housing is configured to secure the first wooden member to the second wooden member with the first and second wooden members abutting against each other.

\* \* \* \* \*